Oct. 31, 1967  MINORU SUZUKI ET AL  3,349,678
AUTOMATIC LIGHT RESPONSIVE SHUTTER TIMING MECHANISM
Filed Nov. 23, 1964

INVENTORS
MINORU SUZUKI
NAOYUKI UNO
BY Stanley Walder
ATTORNEY

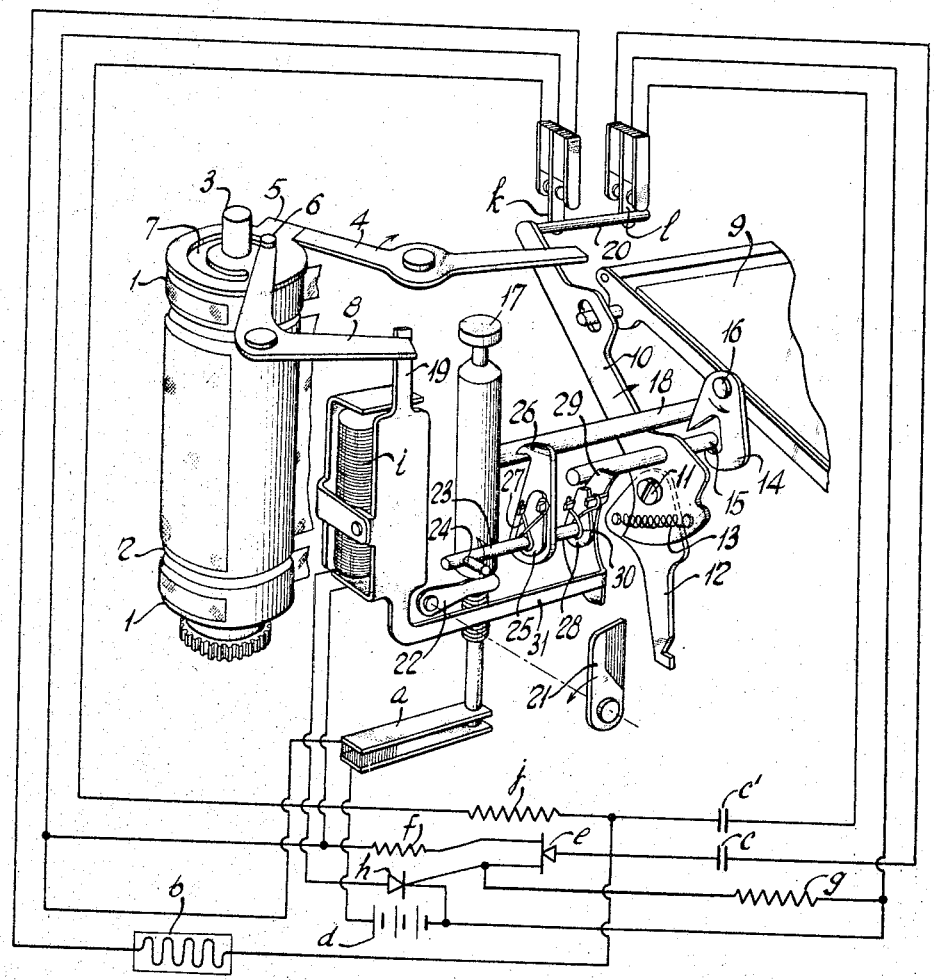

United States Patent Office 3,349,678
Patented Oct. 31, 1967

3,349,678
AUTOMATIC LIGHT RESPONSIVE SHUTTER TIMING MECHANISM
Minoru Suzuki, Suginami-ku, Tokyo-to, and Naoyuki Uno, Urawa-shi, Japan, assignors to Asahi Kogaku Kogyo Kabushiki Kaisha, Tokyo-to, Japan, a corporation of Japan
Filed Nov. 23, 1964, Ser. No. 413,121
Claims priority, application Japan, Nov. 28, 1963, 38/63,459
6 Claims. (Cl. 95—10)

ABSTRACT OF THE DISCLOSURE

The shutter of a camera is controlled by an electrical circuit which is adapted to open and close the shutter in a particular manner. The electrical circuit has a capacitor charging network including a resistor and a photoconductor alternately connected in the timing network. A switch is provided which automatically changes the circuit wherein the resistor is first connected to the timing network for opening the shutter and also substituting the photoconductor for the resistor into the timing network for subsequent closing of the shutter.

---

The present invention relates generally to improvements in camera shutters and it relates particularly to an improved light responsive shutter timing mechanism provided with a self-timing device.

In light responsing automatic cameras the diaphragm, the shutter speed or both are automatically controlled in accordance with the incident light. The self-timing mechanisms generally associated with these cameras are generally of the mechanical clock type. Consequently such cameras possess the aggregate bulk and complexity associated with both the self-timer and the automatic exposure control. There has been previously described a shutter time control mechanism in which upon the opening of the shutter a capacitor is charged through a photoconductor exposed to the light incident on the camera and means are provided for closing the shutter upon the capacitor reaching a predetermined charge. This type of shutter control possesses many advantages but, as with the conventional automatic exposure control, it generally employs a mechanical self-timer with all its accompanying drawbacks and disadvantages.

It is therefore a principal object of the present invention to provide an improved camera automatic exposure mechanism.

Another object of the present invention is to provide an improved light responsive timing device for camera shutters.

Still another object of the present invention is to provide an improved light responsive automatic shutter timing system having a self-timing mechanism.

A further object of the present invention is to provide a camera shutter automatic timing mechanism of the capacitor charge type having a self-timing network.

Still a further object of the present invention is to provide a device of the above nature characterized by its reliability, ruggedness, simplicity and compactness.

The above and other objects of the present invention will become apparent from a reading of the following description taken in conjunction with the accompanying drawings, wherein:

FIGURE 4 is a perspective view of a single lens reflex camera of the focal plane shutter type employing the network of FIGURE 3.

In a sense the present invention contemplates the provision in combination with a camera shutter including control means for successively opening and closing said shutter, of a voltage source, a capacitor charging timing network including at least one capacitor, and a first resistor and a photo conductor selectively connected in said timing network, means for connecting said timing network across said voltage source, means including a solenoid controlled by said timing network, means responsive to a first actuation of said solenoid when said first resistor is connected in said timing network for opening said shutter and connecting said photoconductor into said timing network, and means responsive to a second actuation of said solenoid when said photoconductor is connected in said timing circuit for closing said shutter.

Figure 1:
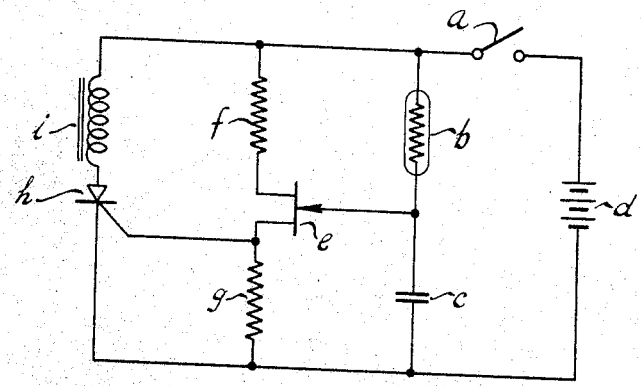
FIGURE 1 is a circuit diagram of a capacitor charging automatic shutter timing network.

As seen in FIGURE 1 of the drawings, the basic shutter timing control network comprises a timing capacitor $c$ connected in series with a photo-conductor $b$, for example a cadmium sulfide cell, and is connected through a switch $a$ across a battery voltage source $d$. The switch $a$ is coupled to the camera shutter to be closed with the opening of the shutter and opened with the closing thereof. A double base diode $e$ has its base electrodes connected through resistors $f$ and $g$ respectively across the battery $d$ by way of the switch $a$ and has its emitter connected to the junction of the capacitor $c$ and the photoconductor $b$. An actuating solenoid $i$ is connected through the output electrodes of a silicon controlled rectifier $h$ and the switch $a$ across the battery $d$, the rectifier control electrode being connected to diode lower base electrode. The solenoid $i$ is operatively associated with the camera shutter closure release member whereby to effect the closing of the shutter with the energization of the solenoid $i$.

In the operation of the network illustrated in FIGURE 1 upon closure of the switch $a$ with the opening of the camera shutter, the capacitor $c$ is charged by the battery $d$ through the photoconductor $b$ at a rate determined by the resistance of the photoconductor and hence the light incident thereon which corresponds to that directed from the object to the camera. Upon the capacitor $c$ reaching a predetermined charge voltage, the diode $e$ is rendered conductive to rapidly discharge the capacitor $c$ through the resistor $g$, and the heavy current through the resistor $g$ effects the application of a triggering signal to the silicon controlled rectifier $i$. The momentarily energized solenoid $i$ actuates the shutter closure element to complete the exposure cycle.

Figure 3:
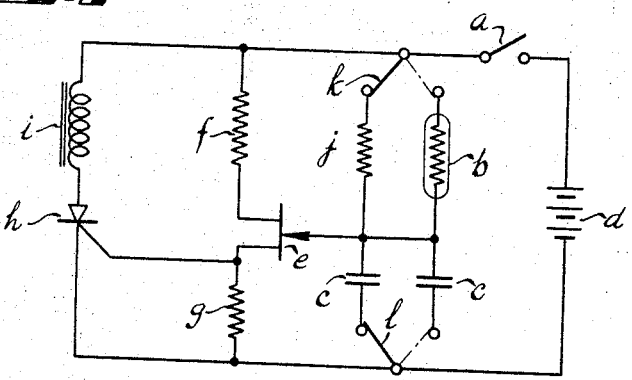
FIGURE 3 is a circuit diagram of another embodiment of the present invention.

Referring now to FIGURES 3 and 4 of the drawings which illustrate a preferred embodiment of the present invention employing the basic circuit described above, similar reference numerals designating corresponding elements, there are provided two double throw switches $k$ and $l$ which are simultaneously actuated, as will be hereinafter set forth. The switch $k$ includes a switch arm which is connected through the switch $a$ to one terminal of the battery $d$ and the switch $l$ includes a switch arm which is connected to the other terminal thereof. The first pole of the switch $k$ is connected to the free end of the photoconductor $b$ remote from the capacitor $c$ and the first pole of the switch $l$ is connected to the free end of the capacitor $c$ remote from the photoconductor $b$. The second pole of the switch $k$ is connected through a timing resistor $j$ to the diode emitter and the second pole of the switch $l$ is connected through a second timing capacitor $c'$ to the diode emitter. The arms of the switches $k$ and *l* are operated to simultaneously engage the first or second switch poles whereby to alternately connect the timing networks including the resistor *j* and capacitor *c'* or the photoconductor *b* and the capacitor *c* across the battery *d*. In all other respects the network illustrated in FIGURE 3 is similar to that of FIGURE 1.

The camera is of the single lens reflex focal plane shutter type and includes a suitably mounted shutter leading screen drum 1, a following screen drum 2 loosely fitted to the shaft 3 of the leading screen drum, and a detent lever 4 which engages a radial projection 5 of the wound-up or cocked leading screen drum 1 to releasably lock it in its cocked position. A pin 6 is fixed to the following screen drum 2 and projects through an arcuate groove 7 in an end wall of the leading screen drum 1 whereby to wind or cock the following screen drum 2 with the cocking of the leading screen drum 1 and a detent lever 8 engages the pin 6 in its wound-up position to releasably lock the following screen drum 2 in its cocked position. A swingable reflex mirror 9 is provided and a mirror driving lever 10 is pivoted to a fixed shaft 11 with one end thereof engaging the mirror 9 so that on swinging movement in the direction of the arrow the mirror 9 is swung upwardly and at the same time the leading screen detent lever 4 is swung in the direction of the arrow so that the leading screen drum 1 is disengaged from the detent. An energizing lever 12 is hinged to the shaft 11 adjacent to the driving lever 10 and a tension spring 13 is connected between the energizing lever 12 and the driving lever 10, and a detent lever or latch 14 is pivoted on a pin 16 so that it normally engages a pin 15 carried by the mirror driving lever 10 to releasably lock it. The energizing lever 12 is swung and set in the direction of the arrow in a movement coupled to the winding-up operation of the shutter drums 1 and 2 and tensions the spring 13. Upon depression of a shutter button 17, through a projecting pin 18, the detent lever 14 is swung in the direction of the arrow so that the mirror driving lever 10 is disengaged and, due to the action of the spring 13, is actuated in the direction of the arrow and causes the mirror 9 to be swung and the leading screen drum 1 to be disengaged from the detent lever 4.

The solenoid *i* of the shutter operating network actuates an armature provided with an arm 19 which engages the following screen detent lever 8, and the switch *a* is so arranged as to be closed upon depression of the shutter button 17. The switches *k* and *l* are so arranged as to be simultaneously actuated between their alternate positions, as aforesaid, when the mirror driving lever 10 is operated, by means of the pin 20 secured to the lever 10.

The operation of the arrangement in its ordinary exposure operation is as follows: When the shutter button 17 is depressed with the shutter winding and energizing lever 12 in its energized set position, the switch *a* is closed and the detent lever 14 is swung in the direction of the arrow so that the mirror driving lever 10 is disengaged and is swung in the direction of the arrow. This causes the mirror 9 to swing upwardly and, through the leading screen detent lever 4, the leading screen drum 1 is released and the arms of the switches *k* and *l* are shifted into engagement with the first poles to place the timing circuit including the photoconductor *b* and capacitor *c* into the control circuit. Thereby, upon opening of the shutter, the timing circuit including the photoconductor *b* is closed and actuated so that after the lapse of the proper exposure time, the capacitor *c* reaches a predetermined voltage and the solenoid *i* is then energized to cause the following screen drum 2 to be disengaged from the detent lever 8 and the shutter to close.

The self-timer system of the present arrangement includes a self-timer set lever 21 and a lever 22 arranged coaxially with the set lever 21 and swingable therewith. A rockable shaft 23 is so arranged that upon setting of the set lever 21 by swinging same in the direction of the arrow, it will be caused to swing in the direction of the arrow, through the lever 22 and a pin 24 engaging same. A small lever 25 is fixed to the shaft 23 and a hook lever 26 is loosely fitted on the shaft 23 side by side with the small lever 25. A spring 27 is arranged between and engages the levers 25 and 26 so that upon depression of the shutter button 17 with the set lever 21 having been swung in the direction of the arrow and set to that position, the pin 18 engages the hook lever 26 and is detained in that position. Further a small lever 28 is fixed to the shaft 23 and a lever 29 is loosely fitted to the shaft 23 side by side with said small lever 28, and a spring 30 is arranged between and engages the levers 28 and 29. The lever 29 is so arranged that upon swinging of the shaft 23 in the direction of the arrow the upper portion thereof engages the pin 15 of the mirror driving lever 10 so as to releasably prevent the latter from moving in the direction of the arrow. Further, the lower portion of the lever 29 is so arranged as to be engageable with a lower leg portion 31 of the armature of the solenoid *i*, so that upon energization of the solenoid *i* the lower leg portion 31 of the armature causes the lever 29 to be swung and the mirror driving lever 10 to be disengaged therefrom. The self-timer set lever 21 is so arranged that it returns to the original position in a movement coupled to the returning movement of the mirror 9.

In the operation of the above described arrangement when the self-timer is employed the shutter winding and energizing lever 12 is set and the self-timer set lever 21 is swung in the direction of the arrow to its operable position. Upon depression of the shutter button 17 the mirror driving lever 10 is disengaged from the detent lever 14, but the driving lever 10 is not actuated because it is engaged by the lever 29 of the shaft 23. On the other hand, upon depression of the shutter button 17 the switch *a* is closed and, since the change-over switches *k* and *l* are so positioned as to constitute a circuit including the self-timer timing resistor *j* and the capacitor *c'* and such timing circuit is actuated and after the lapse of a predetermined time interval the solenoid *i* is momentarily energized through the amplifier network by reason of the capacitor *c'* reaching a predetermined voltage and the capacitor *c'* is discharged. As a result, the lower leg portion 31 of the armature of the solenoid *i* pushes the lever 29 so that the mirror driving lever 10 is disengaged therefrom and swings in the direction of the arrow under the influence of the spring 13, causing the mirror 9 to be retracted upwardly. At the same time, the leading screen drum 1 is disengaged from the detent lever 4, the shutter is opened and the switches *k* and *l* are changed-over to replace the resistor *j* capacitor *c'* network with the photoconductor *b* capacitor *c* network. (Following the above cycle the solenoid *i* is de-energized and the armature returns to its initial state.) As a result, the timing circuit including the photoconductor *b* is actuated. After the lapse of an auomatically regulated time due, as aforesaid, to the resistance value at exposure time of the photoconductor *b*, the solenoid *i* is energized again upon the capacitor *c* reaching a predetermined voltage and the capacitor *c* is also discharged. The following screen drum 2 is thus disengaged from the detent lever 8 so that the following screen is permitted to make its return run to close the shutter. In a movement coupled to such movement, the energizing lever 12 is returned to return the mirror 9, and the self-timer set lever 21 is returned.

During the above described operation, upon the first energization the solenoid *i* due to the self-timer timing circuit, the following screen detent lever 8 is influenced by this actuation and disengages the following screen drum 2. However, at this moment the leading screen drum 1 is still under the detention of the detent lever 4 so that through this detention the following screen drum 2 is also maintained in its cocked state. Upon deenergization of the solenoid *i* the following screen drum 2 is again brought under the detention of the detent lever 8.

According to the arrangement of the present invention as mentioned above, an electric self-timer can be constituted by utilizing the major portion of the photoelectric time control shutter arrangement, so that it is effective in making the self-timer mechanism simpler and also in facilitating the incorporation of a self-timer in a photographic camera.

Figure 2:
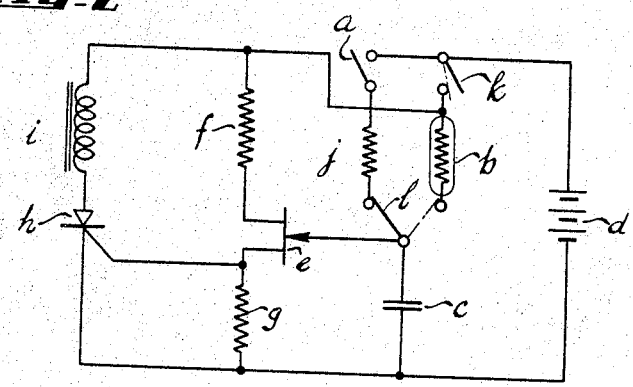
FIGURE 2 is a circuit diagram of a capacitor charging automatic shutter timing network provided with a self-timer in accordance with the present invention.

The circuit network illustrated in FIGURE 2 may be substituted from that illustrated in FIGURE 3 and differs therefrom in that a common capacitor *c* is employed in the self-time and automatic light timing network and in all other respects operates in the manner of the embodiment last described. Specifically the timing capacitor *c* is connected between the emitter of the double base diode *e* and a terminal of the battery *d* and the diode emitter is connected to the arm of the double throw switch 1. The first pole of the switch 1 is connected through the photoconductor *b* to the first and only active pole of the switch *k* the arm of which is connected to the other terminal of the battery *d*. The second pole of the switch *l* is connected through the self-timer resistor *j* in series with the switch *a* to the other terminal of the battery *d*.

The network of FIGURE 2 is employed with the shutter mechanism described above in the manner of the network of FIGURE 3. The self-timing and exposure sequence is initiated with the closing of switch *a* which effects the charging of capacitor *c* through the timing resistor *j* and the second pole closed switch *l*. Upon the capacitor *c* reaching a predetermined voltage the capacitor *c* is discharged and the solenoid *i* is momentarily energized to release the leading shutter shade and open the shutter and to close switch *k* and shift the arm of switch *l* to the first pole. Thereafter the capacitor *c* is charged through the photoconductor *b* until it reaches a predetermined voltage to again discharge the capacitor *c* and energize the solenoid *i* which effects the release of the trailing shutter blade and the closing of the shutter as earlier set forth.

While there have been described and illustrated preferred embodiments of the present invention it is apparent that numerous alterations, omissions and additions may be made without departing from the spirit thereof.

What is claimed is:

1. In combination with a camera shutter including control means for successively opening and closing said shutter comprising a voltage source, a capacitor charging timing network including at least one capacitor, and a first resistor and a photoconductor selectively connected in said timing network, means for connecting said timing network across said voltage source, means including a solenoid controlled by said timing network, means responsive to a first actuation of said solenoid when said first resistor is connected in said timing network for opening said shutter and connecting said photoconductor into said timing network, and means responsive to a second actuation of said solenoid when said photoconductor is connected in said timing circuit for closing said shutter.

2. In combination with a camera shutter including a shutter opening first release member and a shutter closing second release member comprising a voltage source, a capacitor charging timing network including a resistor and a photoconductor alternatively connected in said timing network and at least one capacitor, means for connecting said timing network across said voltage source, means including a solenoid responsive to said timing network, means responsive to a first actuation of said solenoid when said resistor is connected in said timing network for actuating said first release member and connecting said photoconductor into said timing network, and means responsive to a second actuation of said solenoid when said photoconductor is connected in said timing circuit for actuating said second release member.

3. The combination of claim 2 wherein said release actuating means includes a solenoid responsive to the charge on said capacitor.

4. The combination of claim 2 including means for releasably locking said timing network with said photoconductor in said timing network.

5. In combination with a camera shutter including a shutter opening first release member and a shutter closing second release member comprising a voltage source, a silicon controlled rectifier having a control electrode and output electrodes, a solenoid connected through said silicon controlled rectifier across said voltage source, a double base diode having base electrodes connected through respective first and second resistors to opposite terminals of said voltage source and an emitter electrode, said first base electrode being connected to said silicon controlled rectifier control electrode, a timing capacitor connected between said emitter and first base electrodes through said first resistor, a timing resistor, a photoconductor, switch means connecting said capacitor across said voltage source alternatively through said timing resistor and said photoconductor, and means motivated by said solenoid alternately actuating said first release member together with said switch means to connect said photoconductors to said capacitor and actuating said second release member.

6. In combination with a camera shutter including a shutter opening first release member and a shutter closing second release member comprising a voltage source, a silicon controlled rectifier having a control electrode and output electrodes, a solenoid connected through said silicon controlled rectifier across said voltage source, a double base diode having base electrodes connected through respective first and second resistors to opposite terminals of said voltage source and an emitter electrode, said first base electrode being connected to said silicon controlled rectifier control electrode, a series connected timing resistor and first capacitor first timing network, a series connected photoconductor and second capacitor second timing network, switching means for alternatively connecting said first and second timing networks across said voltage source and said first and second capacitors respectively to said emitter electrode, and means motivated by said solenoid alternatively actuating said first release member together with said switch means to connect said second timing network across said voltage source and said second release member.

References Cited

UNITED STATES PATENTS 3,063,354  11/1962  Matulik et al. _____ 95—53 X

OTHER REFERENCES

Fahlenberg: German application 1,159,261, printed Dec. 12, 1963 (K1 57a 32/03).

NORTON ANSHER, *Primary Examiner.*

JOSEPH F. PETERS, *Assistant Examiner.*